United States Patent
Zou et al.

(10) Patent No.: US 11,979,908 B2
(45) Date of Patent: May 7, 2024

(54) METHOD, DEVICE, TERMINAL AND SYSTEM FOR TRANSMITTING DATA

(71) Applicant: BOE Technology Group Co., Ltd., Beijing (CN)

(72) Inventors: Xiangxiang Zou, Beijing (CN); Yi Bian, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 364 days.

(21) Appl. No.: 17/426,558

(22) PCT Filed: Oct. 28, 2020

(86) PCT No.: PCT/CN2020/124552
§ 371 (c)(1),
(2) Date: Jul. 28, 2021

(87) PCT Pub. No.: WO2022/087925
PCT Pub. Date: May 5, 2022

(65) Prior Publication Data
US 2022/0322437 A1    Oct. 6, 2022

(51) Int. Cl.
*H04W 74/08*    (2009.01)
*H04W 28/00*    (2009.01)
*H04W 48/08*    (2009.01)
*H04W 72/541*    (2023.01)
*H04W 74/0816*   (2024.01)

(52) U.S. Cl.
CPC ..... *H04W 74/0816* (2013.01); *H04W 72/541* (2023.01)

(58) Field of Classification Search
CPC ........... H04W 74/0816; H04W 72/541; H04W 74/0808; H04W 28/00; H04W 48/08
See application file for complete search history.

(56) References Cited

U.S. PATENT DOCUMENTS

2007/0218835 A1 * 9/2007 Hindelang ............. H04B 7/022
455/8
2013/0286998 A1   10/2013 Tamai
(Continued)

FOREIGN PATENT DOCUMENTS

| CN | 101459487 A | 6/2009 |
| CN | 101815323 A | 8/2010 |

(Continued)

OTHER PUBLICATIONS

Office Action dated Mar. 1, 2024 in. CN 202080002517.8,.

*Primary Examiner* — Harry H Kim
(74) *Attorney, Agent, or Firm* — Workman Nydegger

(57) ABSTRACT

The present disclosure can provide a method, device, terminal and system for transmitting data. The method for transmitting data includes: receiving target data from a target gateway via a channel to be detected; detecting whether an interference signal from another terminal for data transmission with the target gateway exists on the channel to be detected within the preset frame interval duration; and stopping receiving the target data when the interference signal exists until the channel to be detected is determined to be idle, and continuing to receive the target data via the idle channel to be detected.

9 Claims, 4 Drawing Sheets

(56) References Cited

U.S. PATENT DOCUMENTS

| | | | |
|---|---|---|---|
| 2015/0055525 A1* | 2/2015 | Ma | H04L 5/0048 |
| | | | 370/281 |
| 2018/0048552 A1* | 2/2018 | Okada | H04L 43/022 |
| 2018/0049143 A1 | 2/2018 | Gupta et al. | |
| 2018/0069684 A1* | 3/2018 | Ziren | H04L 5/14 |
| 2020/0092911 A1 | 3/2020 | Li et al. | |
| 2021/0307005 A1* | 9/2021 | Raghavan | H04W 72/541 |

FOREIGN PATENT DOCUMENTS

| | | |
|---|---|---|
| CN | 102263610 A | 11/2011 |
| CN | 109905205 A | 6/2018 |
| CN | 108966355 A | 12/2018 |
| CN | 110177097 A | 8/2019 |
| CN | 110611935 A | 12/2019 |
| CN | 111757286 A | 10/2020 |
| CN | 111757533 A | 10/2020 |
| WO | WO2017004773 A1 | 12/2017 |

* cited by examiner

METHOD, DEVICE, TERMINAL AND SYSTEM FOR TRANSMITTING DATA

CROSS-REFERENCE TO RELATED APPLICATIONS

The present disclosure is a national phase entry under 35 U.S.C. § 371 of International Application No. PCT/CN2020/124552, filed on Oct. 28, 2020, the entire content of which is incorporated herein by reference.

FIELD

The present disclosure relates to the field of communication, in particular to a method, device, terminal and system for transmitting data.

BACKGROUND

With the development of wireless communication technology, IoT terminal products are increasingly applied to practical scenarios, for instance, smart retail scenarios and smart office scenarios.

Exemplarily, for the conference room scenario in the smart office scenario, the display contents of multiple table labels are often updated in a centralized way before the conference starts, and only one gateway is usually arranged in the same conference room. During updating, the gateway usually distributes information to multiple table labels, and at the same time, the table labels also upload status information to the gateway for communication. When the scale of display content data increases, a certain table label will occupy the channel for a long time. Once the channel avoidance mechanism fails, the channel conflict will occur between the two table labels.

Thus, the existing wireless communication process is prone to channel conflicts between two terminals, which, if not detected in time, will easily lead to invalid data for a long time, resulting in a waste of channel resources.

SUMMARY

The present disclosure provides a method, device, terminal and system for transmitting data. The specific embodiments include the following.

An embodiment of the present disclosure provides a method for transmitting data applied to a terminal, which includes:

receiving target data from a target gateway via a channel to be detected, where the target data includes a plurality of data packets, each data packet in the target data has a same preset frame length, and two adjacent data packets are separated by a preset frame interval duration;

detecting whether an interference signal, from another terminal, and for data transmission with the target gateway, exists on the channel to be detected, within the preset frame interval duration; where a frame interval duration, of a data packet for data transmission between the another terminal and the target gateway, is different from the preset frame interval duration, and a frame length of the data packet of the another terminal is equal to the preset frame length; and stopping receiving the target data when the interference signal exists until the channel to be detected is determined to be idle, and continuing to receive the target data via the idle channel to be detected.

In one embodiment, according to an embodiment of the present disclosure, the stopping receiving the target data when the interference signal exists until the channel to be detected is determined to be idle, and continuing to receive the target data via the idle channel to be detected, includes:

determining that a channel conflict occurs to the channel to be detected when the interference signal exists;

determining one or more data packets to be received of the target data, and a quantity of target packets of the one or more data packets to be received upon the channel conflict occuring to the channel to be detected;

stopping receiving the one or more data packets to be received until the channel to be detected is determined to be idle; and continuing to receive, via the idle channel to be detected, the target data, from a data packet, corresponding to a quantity of one or more data packets received before the target packets, and in the target data.

In one embodiment, according to an embodiment of the present disclosure, the stopping receiving the target data when the interference signal exists until the channel to be detected is determined to be idle, and continuing to receive the target data via the idle channel to be detected, includes:

determining that a channel conflict occurs to the channel to be detected when the interference signal exists;

determining an initial data packet, during the channel conflict, of the target data;

stopping receiving the target data until the channel to be detected is determined to be idle; and continuing to receive the target data, via the idle channel to be detected, from the initial data packet.

In one embodiment, according to an embodiment of the present disclosure, after the detecting whether the interference signal, from the another terminal, and for data transmission with the target gateway, exists on the channel to be detected, within the preset frame interval duration, the method further includes:

continuing to receive the target data when no interference signal is detected.

Accordingly, an embodiment of the present disclosure also provides a device for transmitting data, applied to a terminal, and including:

a receiving unit configured to receive target data from a target gateway via a channel to be detected, where the target data includes a plurality of data packets, each data packet in the target data has a same preset frame length, and two adjacent data packets are separated by a preset frame interval duration;

a detecting unit configured to detect whether an interference signal, from another terminal, and for data transmission with the target gateway, exists on the channel to be detected, within the preset frame interval duration; where a frame interval duration, of a data packets, for data transmission, between the another terminal and the target gateway, is different from the preset frame interval duration, and a frame length of the data packet of the another terminal is equal to the preset frame length; and where the transmitting unit is further configured to stop receiving the target data when the interference signal exists until the channel to be detected is determined to be idle, and continue to receive the target data via the idle channel to be detected.

In one embodiment, according to an embodiment of the present disclosure, the receiving unit is configured to:

determine that a channel conflict occurs to the channel to be detected when the interference signal exists;

determine one or more data packets to be received of the target data, and a quantity of target packets of the one or more data packets to be received upon the channel conflict occurring to the channel to be detected;

stop receiving the one or more data packets to be received until the channel to be detected is determined to be idle; and continue to receive, via the idle channel to be detected, the target data, from a data packet, corresponding to a quantity of one or more data packets received before the target packets, and in the target data.

In one embodiment, according to an embodiment of the present disclosure, the receiving unit is configured to:

determine that a channel conflict occurs to the channel to be detected when the interference signal exists;

determine an initial data packet, during the channel conflict, of the target data;

stop receiving the target data until the channel to be detected is determined to be idle; and continue to receive the target data, via the idle channel to be detected, from the initial data packet.

In one embodiment, according to an embodiment of the present disclosure, after the detecting whether the interference signal, from the another terminal, and for data transmission with the target gateway, exists on the channel to be detected, within the preset frame interval duration, the receiving unit is further configured to:

continue to receive the target data when no interference signal is detected.

Accordingly, an embodiment of the present disclosure also provides a terminal, including:

a display unit;

a receiving unit configured to receive target data from a target gateway via a channel to be detected, where the target data includes a plurality of data packets, each data packet in the target data has a same preset frame length, and two adjacent data packets are separated by a preset frame interval duration;

a detecting unit configured to detect whether an interference signal, from another terminal, and for data transmission with the target gateway, exists on the channel to be detected, within the preset frame interval duration; where a frame interval duration, of a data packet for data transmission, between the another terminal and the target gateway is different from the preset frame interval duration, and a frame length of the data packet of the another terminal is equal to the preset frame length; and the receiving unit is further configured to:

stop receiving the target data when the interference signal exists until the channel to be detected is determined to be idle, and continue to receive the target data via the idle channel to be detected.

Accordingly, an embodiment of the present disclosure also provides a system for transmitting data, including a target gateway and a plurality of terminals communicatively connected with the target gateway; where each terminal is configured to receive target data from the target gateway via a channel to be detected, and the target data includes a plurality of data packets, each data packet in the target data has a same preset frame length, and two adjacent data packets in the target data are separated by a preset frame interval duration;

the each terminal is further configured to detect whether an interference signal, from another terminal of the plurality of terminals, and for data transmission with the target gateway, exists on the channel to be detected, within the preset frame interval duration; and the each terminal is further configured to stop receiving the target data when the interference signal exists until the channel to be detected is determined to be idle, and continue to receive the target data via the idle channel to be detected.

The target gateway is configured to send the plurality of data packets to the plurality of terminals; where the plurality of data packets, sent by the target gateway, to different terminals in the plurality of terminals, have an equal frame length, two adjacent data packets of an equal terminal in the plurality of terminals have an equal frame interval duration, and different terminals in the plurality of terminals have different frame interval durations for respective adjacent two data packets.

In one embodiment, according to an embodiment of the present disclosure, the another terminal is configured to occupy the channel to be detected to transmit data during a period that the each terminal stops receiving the target data when the each terminal detects that the interference signal exists.

In one embodiment, according to an embodiment of the present disclosure, the another terminal is further configured to detect whether an interference signal, from a terminal other than the another terminal in the plurality of terminals, and for data transmission with the target gateway, exists on the channel to be detected, within a frame interval duration corresponding to the another terminal, when occupying the channel to be detected to transmit data, and stop receiving the target data when the interference signal is detected to exist.

Accordingly, an embodiment of the present disclosure also provides a device for transmitting data, including:

a memory and a processor; where the memory is configured to store a computer program;

the processor is configured to execute a computer program in the memory to perform following steps:

receiving target data from a target gateway via a channel to be detected, where the target data includes a plurality of data packets, each data packet in the target data has a same preset frame length, and two adjacent data packets are separated by a preset frame interval duration;

detecting whether an interference signal, from another terminal, and for data transmission with the target gateway, exists on the channel to be tested, within the preset frame interval duration; where a frame interval duration, of a data packet for data transmission between the another terminal and the target gateway, is different from the preset frame interval duration, and a frame length of the data packet of the another terminal is equal to the preset frame length; and stopping receiving the target data when the interference signal exists until the channel to be detected is determined to be idle, and continuing to receive the target data via the idle channel to be detected.

DETAILED DESCRIPTION OF THE EMBODIMENTS

To describe more clearly the purpose, technical solution and advantages of the embodiments of the present disclosure, the technical solution of the embodiments of the present disclosure will be described clearly and completely with reference to the accompanying drawings of the embodiments of the present disclosure. Obviously, the described embodiments are some embodiments of the present disclosure, but not all of them. The embodiments in the present disclosure and the features in the embodiments can be combined with each other without conflict. Based on the described embodiments of the present disclosure, all other embodiments obtained by a person of ordinary skill in the art without creative labor shall fall within the scope of protection of the present disclosure.

Unless otherwise defined, the technical or scientific terms used in the present disclosure shall be understood in a usual sense by those of ordinary skill in the art to which the present disclosure belongs. The words "including" or "comprising" and the like are intended to mean that the component or object appearing before the word covers a component or object appearing after the word and an equivalent thereof, and does not exclude other components or objects.

A channel conflict easily occurs between two terminals in the existing wireless communication process, which, if not detected in time, will easily lead to invalid data for a long time and waste of channel resources.

Accordingly, an embodiment of the present disclosure provides a method, device, terminal and system for improving channel utilization.

Figure 1:
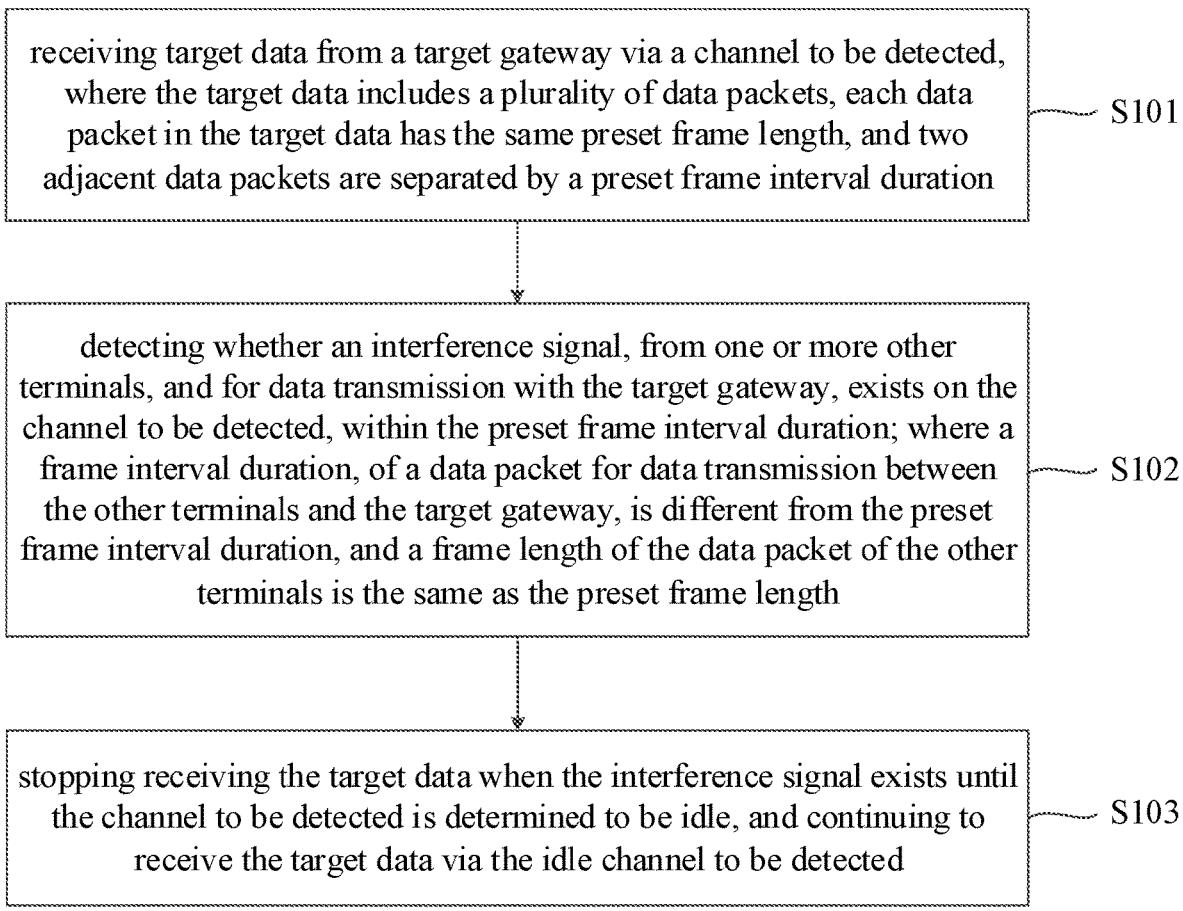
FIG. 1 is a flowchart of a method for transmitting data provided by an embodiment of the present disclosure.

As shown in FIG. 1, an embodiment of the present disclosure provides a method for transmitting data applied to a terminal, which includes:

S101: receiving target data from a target gateway via a channel to be detected, where the target data includes a plurality of data packets, each data packet in the target data has the same preset frame length, and two adjacent data packets are separated by a preset frame interval duration.

Figure 2:
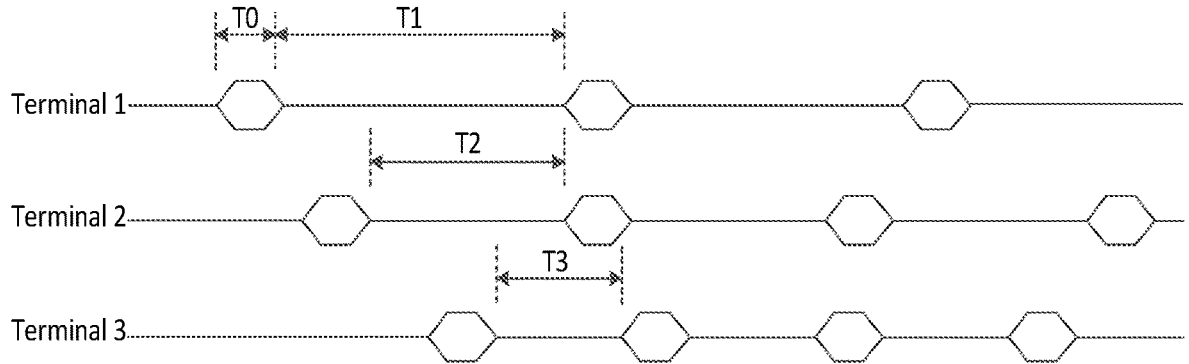
FIG. 2 is a timing diagram of receiving data at three different terminals in a method for transmitting data provided by an embodiment of the present disclosure.

In a specific implementation, the timing of data received by each terminal in the same gateway is preset. In this case, all data packets in the data continuously received by all terminals have the same frame length, and the frame interval durations each between two adjacent data packets, of the same terminal, are the same. For example, the frame length of each data packet in a terminal may be set to the same preset frame length, and the frame interval duration between two adjacent data packets may be set to the same preset frame interval time. The frame interval durations each between two adjacent data packets, in the data transmitted by different terminals, are different. FIG. 2 is a timing diagram of receiving data packets at three different terminals, i.e., terminal 1, terminal 2 and terminal 3, where the frame length of each data packet received by the terminal 1, the frame length of each data packet received by the terminal 2, and the frame length of each data packet received by the terminal 3 are all T0, the frame interval durations each between two adjacent data packets in the data received by the terminal 1 is T1, the frame interval durations each between two adjacent data packets in the data received by the terminal 2 is T2, and the frame interval durations each between two adjacent data packets in the data received by terminal 3 is T3, and T1, T2 and T3 are different. In addition, in practical application, when there are multiple terminals in the same gateway, the frame interval duration of one terminal may be set as the shortest frame interval time T4, the frame interval duration of one terminal may be set as the longest frame interval time T5, each of the frame interval durations of other terminals may be set as T (T4≤T≤T5), and each of the frame interval durations corresponding to other terminals may be randomly set as any interval duration of [T4, T5], which is not repeated here.

In a specific implementation, if any terminal in the gateway receives a plurality of target data from the target gateway via the channel to be detected, the corresponding target data may be received in ascending order of packet number.

S102: detecting whether an interference signal, from one or more other terminals, and for data transmission with the target gateway, exists on the channel to be detected, within the preset frame interval duration; where a frame interval duration, of a data packet for data transmission between the other terminals and the target gateway, is different from the preset frame interval duration, and a frame length of the data packet of the other terminals is the same as the preset frame length.

In a specific implementation, a terminal detects whether an interference signal from the other terminal for data transmission with the target gateway exists on the channel to be detected within the preset frame interval duration. The presence of the interference signal from the other terminal indicates that a channel conflict occurs to the channel to be detected. In this case, the frame interval duration corresponding to the other terminal is different from the preset frame interval duration of the terminal, and the frame lengths of the data packets of different terminals are all the preset frame lengths. Hence, when the interference signal from the other terminal occupies the channel to be detected, the terminal is able to detect the interference signal from the other terminal in the first time, so that the channel conflict is processed in time and the communication quality is ensured.

S103: stopping receiving the target data when the interference signal exists until the channel to be detected is determined to be idle, and continuing to receive the target data via the idle channel to be detected.

In a specific implementation, the reception of the target data will be stopped when the interference signal exists, that is, the reception of the target data by the channel to be detected will be immediately interrupted upon the presence of the interference signal from the other terminal, in which case the communication may be suspended for an avoidance purpose. After the reception of the target data is stopped, and until it is determined that the channel to be detected is idle, the reception of the target data will be resumed, which may avoid data loss caused by a channel conflict, ensure the integrity of the target data and improve the efficiency of channel transmission.

In an embodiment of the present disclosure, the reception of the target data will be stopped when the interference signal from the other terminal exists, at which time the other terminals will continue to receive the data to be received, thus ensuring the utilization rate of the channel. In addition, while the other terminals continue to receive the data to be received, if it is necessary to detect the channel to be detected, once a channel conflict is detected, the communication will be interrupted until the channel is idle and the communication of other terminals is resumed, thus ensuring the communication efficiency.

Figure 3:
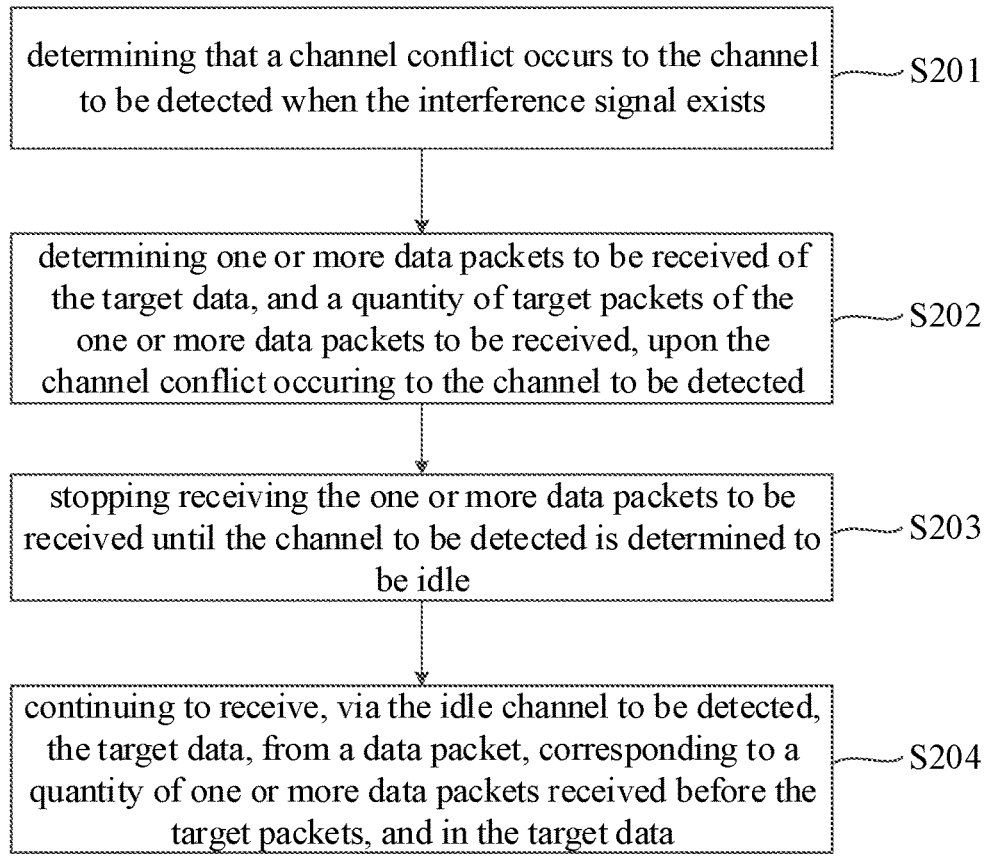
FIG. 3 is a method flow chart of step S103 in a method for transmitting data provided by an embodiment of the present disclosure.

In an embodiment of the present disclosure, as shown in FIG. 3, the S103, i.e., stopping receiving the target data when the interference signal exists until the channel to be detected is determined to be idle, and continuing to receive the target data via the idle channel to be detected, includes:

S201: determining that a channel conflict occurs to the channel to be detected when the interference signal exists;

S202: determining one or more data packets to be received of the target data, and a quantity of target packets of the one or more data packets to be received, upon the channel conflict occuring to the channel to be detected;

S203: stopping receiving the one or more data packets to be received until the channel to be detected is determined to be idle; and S204: continuing to receive, via the idle channel to be detected, the target data, from a data packet, corresponding to a quantity of one or more data packets received before the target packets, and in the target data.

In a specific implementation, the steps S201 to S204 are implemented as follows.

First, if there is an interference signal from another terminal, it is determined that a channel conflict has occured at the terminal to be detected, and then, one or more data packets to be received for the target data and the number of target packets corresponding to the data packets to be received are determined, upon the channel conflict occuring to the channel to be detected. That is, the data packets to be received for the target data and the number of target packets corresponding to the data packets to be received, are determined at the beginning of a channel conflict in the channel to be detected. For example, an $m^{th}$ data packet in the target data is being received on the channel to be detected at the time of the channel conflict. Second, the reception of the data packets to be received is stopped, for example, the reception of an $m^{th}$ data packet is stopped, until the channel to be detected is determined to be idle, and the target data continues to be received, via the idle channel to be detected, from a data packet corresponding to the number of data packets received before the target packets, and in the target data. For example, until it is determined that the channel to be determined is idle, the target data continues to be received, from an $(m-1)^{th}$ data packet received before the $m^{th}$ data packet in the target data. That is, until the channel to be detected is determined to be idle, the communication is started again, starting with a data packet prior to the communication interruption, so that the efficiency of data transmission is ensured and the power consumption is reduced.

Figure 4:
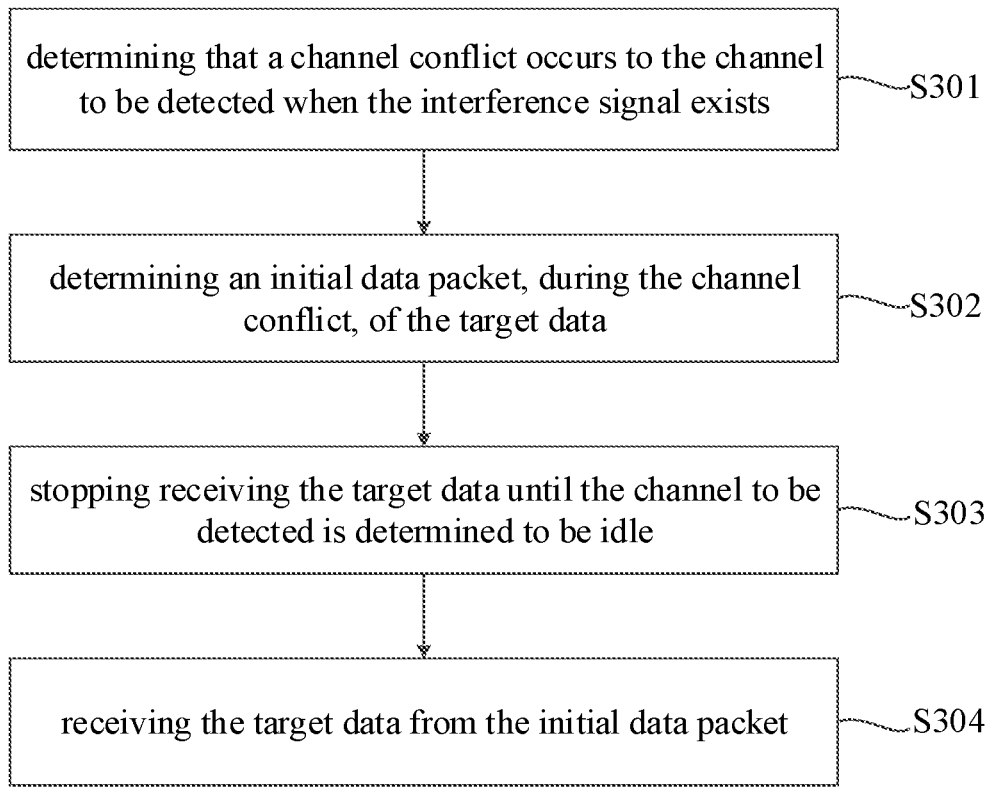
FIG. 4 is a method flow chart after step S201 in a method for transmitting data provided by an embodiment of the present disclosure.

In an embodiment of the present disclosure, as shown in FIG. 4, the step S103, stopping receiving the target data when the interference signal exists until the channel to be detected is determined to be idle, and continuing to receive the target data via the idle channel to be detected, includes:

S301: determining that a channel conflict occurs to the channel to be detected when the interference signal exists;

S302: determining an initial data packet, during the channel conflict, of the target data; S303: stopping receiving the target data until the channel to be detected is determined to be idle; and S304: receiving the target data from the initial data packet.

In a specific implementation, the steps S301 to S304 are implemented as follows.

First, if there is an interference signal from another terminal, it is determined that a channel conflict has occured at the terminal to be detected, and then, an initial data packet, during the channel conflict, of the target data, is determined, for example, a first data packet of the target data is determined, during a channel conflict on the channel to be detected. Second, the reception of the target data is stopped until the channel to be detected is determined to be idle, and the target data continues to be received from the initial data packet via the idle channel to be detected. For instance, a channel conflict is detected at the beginning of the channel conflict and is avoid by suspending communication until the channel is idle, and then the communication continues to be started, which can be continued by receiving the target data from an initial data packet of the target data, thereby ensuring communication quality.

According to an embodiment of the present disclosure, after the step S102, i.e., after detecting whether the interference signal from the another terminal for data transmission with the target gateway exists on the channel to be detected within the preset frame interval duration, the method further includes:

continuing to receive the target data when no interference signal is detected.

In a specific implementation, if no interference signals from other terminals are detected in the channel to be detected within the preset frame interval duration, the target data continues to be received on the channel to be detected, thus ensuring the integrity of terminal data transmission.

Figure 5:
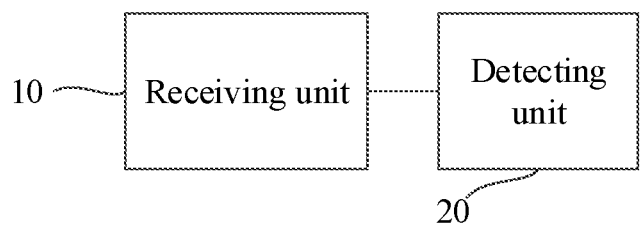
FIG. 5 is a structural schematic diagram of a device for transmitting data provided by an embodiment of the present disclosure.

Based on the same inventive concept, as shown in FIG. 5, an embodiment of the present disclosure also provides a device for transmitting data applied to a terminal, which includes:

a receiving unit 10 configured to receive target data from a target gateway via a channel to be detected, where the target data includes a plurality of data packets, each data packet in the target data has a same preset frame length, and two adjacent data packets are separated by a preset frame interval duration;

a detecting unit 20 configured to detect whether an interference signal, from another terminal, and for data transmission with the target gateway, exists on the channel to be detected, within the preset frame interval duration; where a frame interval duration, of a data packet for data transmission, between the another terminal and the target gateway, is different from the preset frame interval duration, and a frame length of the data packet of the another terminal is equal to the preset frame length; and the receiving unit 10 further configured to stop receiving the target data when the interference signal exists until the channel to be detected is determined to be idle, and continue to receive the target data via the idle channel to be detected.

According to an embodiment of the present disclosure, the receiving unit 10 is configured to:

determine that a channel conflict occurs to the channel to be detected when the interference signal exists;

determine one or more data packets to be received of the target data, and a quantity of target packets of the one or more data packets to be received upon the channel conflict occuring to the channel to be detected;

stop receiving the one or more data packets to be received until the channel to be detected is determined to be idle; and continue to receive, via the idle channel to be detected, the target data, from a data packet, corresponding to a quantity of one or more data packets received before the target packets, and in the target data.

According to an embodiment of the present disclosure, the receiving unit 10 is configured to:

determine that a channel conflict occurs to the channel to be detected when the interference signal exists;

determine an initial data packet, during the channel conflict, of the target data;

stop receiving the target data until the channel to be detected is determined to be idle; and continue to receive the target data, via the idle channel to be detected, from the initial data packet.

According to an embodiment of the present disclosure, after the detecting unit 20 detects whether the interference signal from the another terminal, and for data transmission with the target gateway, exists on the channel to be detected, within the preset frame interval duration, the receiving unit 10 is further configured to:

continue to receive the target data when no interference signal is detected.

Based on the same inventive concept, an embodiment of the present disclosure provides a terminal, including:

a display unit, through which the terminal displays data in a specific implementation, where the display unit may be an electronic paper module, a LCD module, an OLED module and the like;

a receiving unit 10 configured to receive target data from a target gateway via a channel to be detected, where the target data includes a plurality of data packets, each data packet in the target data has a same preset frame length, and two adjacent data packets are separated by a preset frame interval duration;

a detecting unit 20 configured to detect whether an interference signal from another terminal, and for data transmission with the target gateway, exists on the channel to be detected, within the preset frame interval duration; where a frame interval duration, of a data packet, for data transmission, between the another terminal and the target gateway is different from the preset frame interval duration, and a frame length of the data packet of the another terminal is equal to the preset frame length; and the receiving unit 10 further configured to stop receiving the target data when the interference signal exists until the channel to be detected is determined to be idle, and continue to receive the target data via the idle channel to be detected.

Figure 6:
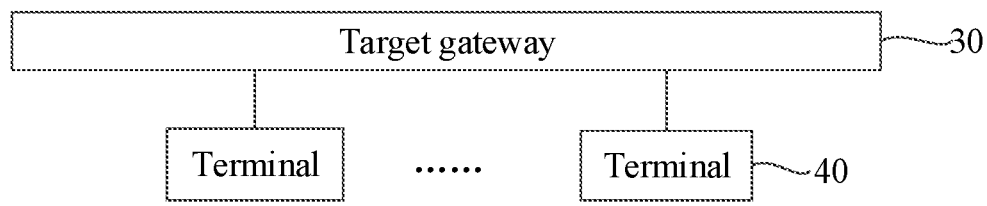
FIG. 6 is a schematic structural diagram of a system for transmitting data provided by an embodiment of the present disclosure.

Based on the same inventive concept, as shown in FIG. 6, an embodiment of the present disclosure provides a system for transmitting data, which includes a target gateway 30 and a plurality of terminals 40 communicatively connected with the target gateway 30; the terminals are configured to receive target data from the target gateway 30 via a channel to be detected; where the target data includes a plurality of data packets, each of the data packets in the target data has the same preset frame length, and two adjacent data packets in the target data are separated by a preset frame interval duration;

the terminals are further configured to detect whether an interference signal, from other terminals of the plurality of terminals, and for data transmission with the target gateway 30, exists on the channel to be detected within the preset frame interval duration;

the terminals are further configured to stop receiving the target data when the interference signal exists until the channel to be detected is determined to be idle, and continue to receive the target data via the idle channel to be detected.

The target gateway 30 is configured to send the plurality of data packets to the plurality of terminals; where the plurality of data packets, sent by the target gateway 30, to different terminals in the plurality of terminals, have the same frame lengths, two adjacent data packets of the same terminal in the plurality of terminals have the same frame interval duration, and different terminals in the plurality of terminals have different frame interval durations for respective adjacent two data packets.

According to an embodiment of the present disclosure, the another terminal is configured to occupy the channel to be detected to transmit data during a period that the each terminal stops receiving the target data when the each terminal detects that the interference signal exists.

In an embodiment of the present disclosure, the reception of the target data is stopped when the terminal detects that the interference signal exists and the channel conflict occurs to the terminal, which improves the utilization rate of the channel to be detected and the efficiency of data transmission.

According to an embodiment of the present disclosure, the another terminal is further configured to detect whether an interference signal, from a terminal other than the another terminal in the plurality of terminals, and for data transmission with the target gateway, exists on the channel to be detected within its own frame interval duration when occupying the channel to be detected to transmit data, and stop receiving the target data when the interference signal is detected to exist.

In a specific implementation, the another terminal may also continue to detect whether an interference signal from other terminals exists. If so, the data transmission of the other terminals may be ensured by channel avoidance, thus improving the efficiency of data transmission.

Figure 7:
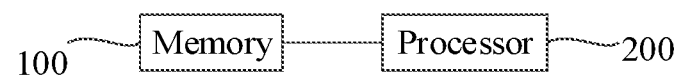
FIG. 7 is a structural schematic diagram of an another device for transmitting data provided by an embodiment of the present disclosure.

Based on the same concept disclosed, as shown in FIG. 7, an embodiment of the present disclosure provides a device for transmitting data, including:

a memory 100 and a processor 200; where the memory 100 is configured to store a computer program;

the processor 200 is configured to execute a computer program in the memory 100 to perform following steps:

receiving target data from a target gateway via a channel to be detected, where the target data includes a plurality of data packets, each of the data packets in the target data has the same preset frame length, and two adjacent data packets are separated by a preset frame interval duration;

detecting whether an interference signal, from another terminal, and for data transmission with the target gateway, exists on the channel to be detected within the preset frame interval duration; where a frame interval duration, of a data packet for data transmission between the another terminal and the target gateway, is different from the preset frame interval duration, and a frame length of the data packet of the another terminal is the same as the preset frame length; and stopping receiving the target data when the interference signal exists until the channel to be detected is determined to be idle, and continuing to receive the target data via the idle channel to be detected.

In one embodiment, the processor 200 may specifically be a central processing unit, an application specific integrated circuit (ASIC), and one or more integrated circuits for controlling program execution.

In one embodiment, the memory 100 may include a Read Only Memory (ROM), a Random Access Memory (RAM) and a disk memory. The memory 100 is used to store data required for the operation of the processor 200, i.e., a computer program capable of being executed by the processor 200, and the processor 200 executes the method shown in FIG. 1 by executing the computer program stored in the memory 100. Here, the number of memory 100 is one or more and the number of processors 200 is one or more.

Here, the physical devices corresponding to the receiving unit 10 and the detecting unit 20 may be the processor 200. The device may be used for executing the method provided in the embodiment shown in FIG. 1, for example, receiving target data from a target gateway via a channel to be detected, where the target data includes a plurality of data packets, each of the data packets in the target data has the same preset frame length, and two adjacent data packets are separated by a preset frame interval duration;

detecting whether an interference signal, from another terminal, and for data transmission with the target gateway, exists on the channel to be detected within the preset frame interval duration; where a frame interval duration, of a data packet for data transmission between the another terminal and the target gateway, is different from the preset frame interval duration, and a frame length of the data packet of the another terminal is the same as the preset frame length; and stopping receiving the target data when the interference signal exists until the channel to be detected is determined to be idle, and continuing to receive the target data via the idle channel to be detected. Therefore, refer to the corresponding description in the embodiment shown in FIG. 1 for the functions that can be achieved by each functional module in the device, which are not repeated here.

An embodiment of the present disclosure also provides a computer non-transient storage medium, where the storage medium stores computer instructions for causing a computer to execute the method for transmitting data when the computer instructions run on a computer.

Those skilled in the art should realize that an embodiment of the present disclosure may be provided as a method, a system or a computer program product. Therefore, the present disclosure may be implemented as a completely hardware embodiment, a completely software embodiment, or an embodiment combing software and hardware. Furthermore, the present disclosure may use forms of computer program products implemented on one or more computer storage media (including, but not limited to a magnetic disk memory, a CD-ROM, an optical memory or the like) which include a computer program code.

The present disclosure is described with reference to flow diagrams and/or block diagrams of the method in the embodiments of the present disclosure, a device (system) and a computer program product. It should be understood that each flow and/or block in the flow diagrams and/or block diagrams and a combination thereof may be implemented by means of computer program instructions. These computer program instructions may be provided for a general-purpose computer, a special-purpose computer, an embedded processor or processors of other programmable data processing devices to generate a machine, so as to generate an apparatus configured to implement designated functions in one or more flows of a flow diagram and/or one or more blocks of a block diagram by means of instructions executed by a computer or processors of other programmable data processing devices.

These computer program instructions may also be stored in a computer-readable memory that may guide a computer or other programmable data processing devices to work in a particular way, so that the instructions stored in the computer-readable memory generate a manufactured product including instruction means that implements the designated functions in one or more flows of a flow diagram and/or one or more blocks of a block diagram.

The computer program instructions may also be loaded to the computer or other programmable data processing devices, so that a series of operational steps are executed on the computer or other programmable devices to generate computer implemented processing, and therefore, instructions executed on the computer or other programmable devices provide steps used for implementing functions designated in one or more processes in the flow charts and/or one or more blocks in the block diagrams.

Although the preferred embodiments of the present disclosure have been described, those skilled in the art may make additional changes and modifications to these embodiments once they know the basic inventive concepts. Therefore, the appended claims are intended to be interpreted as including the preferred embodiments and all changes and modifications falling within the scope of the present disclosure.

It will be clear to those skilled in the art that various modifications and variations may be made to the present disclosure without departing from the spirit and scope of the present disclosure. Thus, if these modifications and variations of the present disclosure fall within the scope of the claims of the present disclosure and the equivalents thereof, the present disclosure is also intended to include these modifications and variations.

What is claimed is:

1. A method for transmitting data, applied to a terminal, and comprising:
   receiving target data from a target gateway via a channel to be determined, wherein
   the target data comprises a plurality of data packets, each data packet in the target data has a same preset frame length, and two adjacent data packets are separated by a preset frame interval duration;
   detecting whether an interference signal, from another terminal, and for data transmission with the target gateway, exists on the channel to be determined, within the preset frame interval duration, wherein
   a frame interval duration, of a data packet for data transmission between the another terminal and the target gateway, is different from the preset frame interval duration, and
   a frame length of the data packet of the another terminal is equal to the preset frame length; and
   stopping receiving the target data when the interference signal exists until the channel to be determined is determined to be idle, and continuing to receive the target data via the idle channel to be determined.

2. The method of claim 1, wherein the stopping receiving the target data when the interference signal exists until the channel to be determined is determined to be idle, and continuing to receive the target data via the idle channel to be determined, comprises:
   determining that a channel conflict occurs to the channel to be determined when the interference signal exists;
   determining one or more data packets to be received of the target data, and a quantity of target packets of the one or more data packets to be received, upon the channel conflict occurring to the channel to be determined;
   stopping receiving the one or more data packets to be received until the channel to be determined is determined to be idle; and
   continuing to receive, via the idle channel to be determined, the target data, from a data packet, corresponding to a quantity of one or more data packets received before the target packets, and in the target data.

3. The method of claim 1, wherein the stopping receiving the target data when the interference signal exists until the channel to be determined is determined to be idle, and continuing to receive the target data via the idle channel to be determined, comprises:
determining that a channel conflict occurs to the channel to be determined when the interference signal exists;
determining an initial data packet, during the channel conflict, of the target data;
stopping receiving the target data until the channel to be determined is determined to be idle; and
continuing to receive the target data, via the idle channel to be determined, from the initial data packet.

4. The method of claim 1, wherein after the detecting whether the interference signal, from the another terminal, and for data transmission with the target gateway, exists on the channel to be determined, within the preset frame interval duration, the method further comprises:
continuing to receive the target data when no interference signal is determined.

5. A computer non-transient readable storage medium, wherein:
the storage medium stores computer instructions for causing a computer to execute the method for transmitting data of claim 1 when the computer instructions run on the computer.

6. A system for transmitting data, comprising a target gateway and a plurality of terminals communicatively connected with the target gateway; wherein
each terminal is configured to receive target data from the target gateway via a channel to be determined, and
the target data comprises a plurality of data packets, each data packet in the target data has a same preset frame length, and two adjacent data packets in the target data are separated by a preset frame interval duration;
the each terminal is further configured to detect whether an interference signal, from another terminal of the plurality of terminals, and for data transmission with the target gateway, exists on the channel to be determined, within the preset frame interval duration; and
the each terminal is further configured to stop receiving the target data when the interference signal exists until the channel to be determined is determined to be idle, and continue to receive the target data via the idle channel to be determined; and
the target gateway is configured to send the plurality of data packets to the plurality of terminals, wherein
the plurality of data packets, sent by the target gateway, to different terminals in the plurality of terminals, have an equal frame length,
two adjacent data packets of an equal terminal in the plurality of terminals have an equal frame interval duration, and
different terminals in the plurality of terminals have different frame interval durations for respective adjacent two data packets.

7. The system for transmitting data of claim 6, wherein the another terminal is configured to:
occupy the channel to be determined to transmit data during a period that the each terminal stops receiving the target data when the each terminal detects that the interference signal exists.

8. The system for transmitting data of claim 7, wherein the another terminal is further configured to:
detect whether an interference signal, from a terminal other than the another terminal in the plurality of terminals, and for data transmission with the target gateway, exists on the channel to be determined within a frame interval duration corresponding to the another terminal, when occupying the channel to be determined to transmit data, and
stop receiving the target data when the interference signal is determined to exist.

9. A device for transmitting data, comprising:
a memory and a processor, wherein
the memory is configured to store a computer program;
the processor is configured to execute a computer program in the memory to perform following steps:
receiving target data from a target gateway via a channel to be determined, wherein
the target data comprises a plurality of data packets, each data packet in the target data has a same preset frame length, and two adjacent data packets are separated by a preset frame interval duration;
detecting whether an interference signal, from another terminal, and for data transmission with the target gateway, exists on the channel to be determined, within the preset frame interval duration, wherein
a frame interval duration, of a data packet for data transmission between the another terminal and the target gateway, is different from the preset frame interval duration, and
a frame length of the data packet of the another terminal is equal to the preset frame length; and
stopping receiving the target data when the interference signal exists until the channel to be determined is determined to be idle, and continuing to receive the target data via the idle channel to be determined.

* * * * *